United States Patent

Huang

(10) Patent No.: US 10,112,622 B2
(45) Date of Patent: Oct. 30, 2018

(54) METHOD OF OPERATING A VEHICLE ACCORDING TO A REQUEST BY A VEHICLE OCCUPANT

(71) Applicant: Bayerische Motoren Werke Aktiengesellschaft, Munich (DE)

(72) Inventor: Pei-Shih Dennis Huang, Reichertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 149 days.

(21) Appl. No.: 15/210,984

(22) Filed: Jul. 15, 2016

(65) Prior Publication Data

US 2016/0325758 A1     Nov. 10, 2016

Related U.S. Application Data

(63) Continuation of application No. PCT/EP2014/078187, filed on Dec. 17, 2014.

(30) Foreign Application Priority Data

Jan. 17, 2014  (DE) .................. 10 2014 200 782

(51) Int. Cl.
 B60W 50/00  (2006.01)
 B60W 50/10  (2012.01)
 (Continued)

(52) U.S. Cl.
 CPC ........... B60W 50/10 (2013.01); A61B 5/0476 (2013.01); B60K 37/06 (2013.01); B60W 10/04 (2013.01);
 (Continued)

(58) Field of Classification Search
 CPC .................................................. B60W 50/10
 See application file for complete search history.

(56) References Cited

U.S. PATENT DOCUMENTS 5,157,384 A * 10/1992 Greanias ................. G06F 3/023
                                                                345/156
9,502,050 B2 * 11/2016 Buck ....................... G10L 21/02
(Continued)

FOREIGN PATENT DOCUMENTS

DE   10 2007 040 288 A1   2/2009
DE   10 2009 040 674 A1   7/2010
(Continued)

OTHER PUBLICATIONS

International Search Report (PCT/ISA/210) issued in PCT Application No. PCT/EP2014/078187 dated Jul. 10, 2015 with English translation (seven pages).

(Continued)

*Primary Examiner* — Truc M Do
(74) *Attorney, Agent, or Firm* — Crowell & Moring LLP

(57) ABSTRACT

A vehicle includes at least one main sensor unit, the measurement signal of which is characteristic of a main driver desire of a vehicle occupant with regard to an influence on the driving behavior of the vehicle, and at least one secondary sensor unit, the measurement signal of which is characteristic of a secondary driver desire. The main driver desire is represented by a motion of a hand or a foot of the vehicle occupant. The secondary driver desire is represented in a manner other than by the motion of the hand or the foot of the vehicle occupant. The vehicle also has at least one actuator. The actuator influences the driving behavior of the vehicle in dependence on a control signal. A resulting driver desire with regard to the influence on the driving behavior of the vehicle is determined in dependence on the main driver desire and in dependence on the secondary driver desire. In the case of a neutral value of the main driver desire, the secondary driver desire is assigned to the resulting driver desire. Otherwise, the main driver desire is assigned to the (Continued)

resulting driver desire. The control signal is produced in dependence on the resulting driver desire.

13 Claims, 2 Drawing Sheets

(51) Int. Cl.
    *B60K 37/06* (2006.01)
    *B60W 10/04* (2006.01)
    *B60W 10/184* (2012.01)
    *B60W 10/20* (2006.01)
    *G06F 3/038* (2013.01)
    *A61B 5/0476* (2006.01)
    *B60W 10/18* (2012.01)
    *B62D 1/28* (2006.01)
    *G06F 3/01* (2006.01)

(52) U.S. Cl.
    CPC .......... *B60W 10/18* (2013.01); *B60W 10/184* (2013.01); *B60W 10/20* (2013.01); *B62D 1/286* (2013.01); *G06F 3/015* (2013.01); *G06F 3/017* (2013.01); *G06F 3/038* (2013.01); *B60W 2050/0091* (2013.01); *B60W 2540/02* (2013.01); *B60W 2540/10* (2013.01); *B60W 2540/12* (2013.01); *B60W 2540/18* (2013.01); *B60W 2540/22* (2013.01); *G06F 2203/0381* (2013.01)

(56) References Cited

U.S. PATENT DOCUMENTS

| | | | | |
|---|---|---|---|---|
| 9,707,942 | B2* | 7/2017 | Cheatham, III | B60T 7/12 |
| 9,840,230 | B2* | 12/2017 | Miller | B60R 25/20 |
| 2004/0117098 | A1* | 6/2004 | Ryu | A61B 5/18 |
| | | | | 701/70 |
| 2010/0114450 | A1* | 5/2010 | Huang | B60K 31/00 |
| | | | | 701/93 |
| 2011/0125362 | A1* | 5/2011 | Matsunaga | B60W 40/08 |
| | | | | 701/31.4 |
| 2012/0316780 | A1* | 12/2012 | Huth | G01C 21/36 |
| | | | | 701/450 |
| 2013/0204457 | A1 | 8/2013 | King et al. | |
| 2015/0105939 | A1* | 4/2015 | Blaesing | G06F 3/017 |
| | | | | 701/1 |
| 2015/0127351 | A1* | 5/2015 | Buck | G10L 21/02 |
| | | | | 704/270 |
| 2015/0191178 | A1* | 7/2015 | Roy | B60W 40/09 |
| | | | | 701/36 |
| 2016/0325758 | A1* | 11/2016 | Huang | B60W 50/10 |

FOREIGN PATENT DOCUMENTS

| | | |
|---|---|---|
| DE | 10 2010 062 756 A1 | 6/2012 |
| DE | 10 2011 121 484 A1 | 6/2013 |
| DE | 10 2012 012 697 A1 | 1/2014 |
| DE | 10 2012 013 503 A1 | 1/2014 |
| EP | 2 591 976 A1 | 5/2013 |
| JP | 7-81498 A | 3/1995 |
| JP | 2006-51343 A | 2/2006 |
| JP | 2007-283968 A | 11/2007 |
| JP | 2008-180591 A | 8/2008 |
| JP | 2011-232637 A | 11/2011 |
| JP | 2013-86750 A | 5/2013 |
| WO | WO 2008/136456 A1 | 11/2008 |
| WO | WO 2010/007505 A1 | 1/2010 |

OTHER PUBLICATIONS

German-language Written Opinion (PCT/ISA/237) issued in PCT Application No. PCT/EP2014/078187 dated Jul. 10, 2015 (six pages).

German Search Report issued in counterpart German Application No. 10 2014 200 782.8 dated Dec. 22, 2015 with partial English translation (12 pages).

Japanese Office Action issued in Japanese counterpart application No. 2016-546510 dated Jun. 26, 2018, with partial English translation (Four (4) pages).

* cited by examiner

METHOD OF OPERATING A VEHICLE ACCORDING TO A REQUEST BY A VEHICLE OCCUPANT

CROSS REFERENCE TO RELATED APPLICATIONS

This application is a continuation of PCT International Application No. PCT/EP2014/078187, filed Dec. 17, 2014, which claims priority under 35 U.S.C. § 119 from German Patent Application No. 10 2014 200 782.8, filed Jan. 17, 2014, the entire disclosures of which are herein expressly incorporated by reference.

BACKGROUND AND SUMMARY OF THE INVENTION

The invention relates to a vehicle and to a method for operating the same according to a request by a vehicle occupant. Furthermore, the invention relates to a device for operating a vehicle. Furthermore, the invention relates to a vehicle control system for operating a vehicle. Furthermore, the invention relates to a computer program for operating a vehicle and to a computer program product.

Contemporary vehicles increasingly have operator control facilities. Reliability is a challenge in this context.

U.S. Pat. No. 5,157,384 describes a system with a screen and a plurality of input devices, including a keyboard, a mouse, a contact sensor, a voice sensor and an image sensor. Furthermore, the system includes an interface module for profiles, including application profiles and user profiles. These are files which list input messages which are generated by an alternative input subsystem from input signals of the input devices. The input messages are assigned commands of the input devices which can be used by applications. A user selects the input device in order to input data. As a result of electrical signals of the input device, an input signal is transmitted to the alternative input subsystem which passes on an input message. The application profiles and the user profiles are each checked for a command corresponding to the input message. The command with the higher priority is passed on to an application and a corresponding action carried out.

The object on which the invention is based is to provide a method and a corresponding device which make a contribution to permitting comfortable and safe operation of the vehicle.

According to a first aspect, the invention is distinguished by a method for operating a vehicle. Furthermore, according to a second aspect, the invention is distinguished by a corresponding device for operating the vehicle.

The vehicle has at least one main sensor unit. A measurement signal of the main sensor unit is characteristic of a main driver's request of a vehicle occupant with respect to the influencing of a driving behavior of the vehicle. The main driver's request of the vehicle occupant is represented by a movement of a hand or a foot of the vehicle occupant.

The vehicle also has at least one secondary sensor unit. A measurement signal of the secondary sensor unit is characteristic of a secondary driver's request of the vehicle occupant with respect to the influencing of the driving behavior of the vehicle. The secondary driver's request is represented other than by the movement of the hand or the foot of the vehicle occupant.

Moreover, the vehicle has at least one actuator. The actuator influences the driving behavior of the vehicle as a function of an actuation signal.

As a function of the main driver's request represented by the measurement signal of the main sensor unit and as a function of the secondary driver's request represented by the measurement signal of the secondary sensor unit, a resulting driver's request with respect to the influencing of the driving behavior of the vehicle is determined. In the case of a neutral value of the main driver's request, the secondary driver's request is assigned as the resulting driver's request. Otherwise, the main driver's request is assigned as the resulting driver's request. The actuation signal is generated as a function of the resulting driver's request.

The invention makes use of the realization that the main driver's request can be more reliably detected than the secondary driver's request and, therefore, the resulting driver's request can be reliably determined in accordance with the procedure explained above. Therefore, a contribution is made to the safe driving operation. When the neutral value is present, the secondary driver's request is taken into account with respect to a comfortable driving operation perceived by the vehicle occupant.

The vehicle occupant can be, in particular, a driver of the vehicle.

The influencing of the driving behavior of the vehicle can include simple to complex driving maneuvers. A simple driving maneuver can be, for example, an acceleration process. A complex driving maneuver can be, for example, an overtaking process.

The actuator which influences the driving behavior of the vehicle as a function of the actuation signal can be a steering system, a brake and/or parts of a drive train and/or the drive train.

The main driver's request is represented by a movement of the hand or the foot of the vehicle occupant. The movement of the hand or the foot of the vehicle occupant also includes in this context an application of force to an object, which application brings about a transmission of force into the object or a pressure change within the object.

The main driver's request and secondary driver's request can each have a certain value from the point of view of the vehicle occupant. Therefore, for example, the secondary driver's request can have the same value as the main driver's request from the point of view of the vehicle occupant.

The main sensor unit and the secondary sensor unit can be arranged combined in the form of a single component. In particular, the main sensor unit can optionally be used as a secondary sensor unit.

The neutral value is then assigned to the main driver's request if no main driver's request is supposedly expressed by the vehicle occupant.

In one advantageous refinement according to the first and second aspect, the main sensor unit is embodied as a pressure sensor and/or a torque sensor. Depending on the pressure applied by the vehicle occupant and/or a torque applied by the vehicle occupant it is possible to infer, for example, the intensity of the main driver's request. Predefined influencing of the driving behavior of the vehicle can be assigned to the main driver's request.

In a further advantageous refinement according to the first and second aspect, the main sensor unit is et bodied as a steering angle sensor and/or pedal position encoder.

In a further advantageous refinement according to the first and second aspect, the main sensor unit is embodied as a contact sensor unit and/or a proximity sensor unit. The contact sensor unit or the proximity sensor unit can be here, for example, a plurality of elements which are arranged as a layer. The contact sensor unit and/or the proximity sensor unit can contain sensor elements which are resistive, capacitive, inductive and/or temperature-sensitive. The contact sensor unit and/or proximity sensor unit can be part of what is referred to as a touchscreen.

In a further advantageous refinement according to the first and second aspect, the main sensor unit is embodied as an image-processing main sensor unit. The image-processing main sensor unit can be designed to sense the gesture of the hand or the foot of the vehicle occupant within a predefined space in which of the vehicle occupant may maneuver.

In a further advantageous refinement according to the first and second aspect, the secondary sensor unit is embodied as an image-processing secondary sensor unit. The image-processing secondary sensor unit can be designed to sense movements of the vehicle occupant which do not originate from the hand or the foot of the vehicle occupant.

The image-processing main sensor unit and the image-processing secondary sensor unit can be arranged in a single component, in particular, the image-processing main sensor unit can also optionally be used as an image-processing secondary sensor unit.

In a further advantageous refinement according to the first and second aspect, the secondary driver's request is represented by a viewing direction of the vehicle occupant within a predefined region. For example, a view of the vehicle occupant through a front windshield of the vehicle is sensed. If the predefined region includes, for example, an outer edge of the front windshield, the viewing direction toward the outer edge of the front windshield represents a secondary driver's request.

In a further advantageous refinement according to the first and second aspect, the secondary sensor unit is embodied as an audio signal-processing unit. In this way, the secondary driver's request by the vehicle occupant can also be expressed in the form of an audio signal which is triggered by the vehicle occupant.

In a further advantageous refinement according to the first and second aspect, the secondary driver's request is represented by a voice command of the vehicle occupant. This has the advantage that the vehicle occupant can express the secondary driver's request in away which is very familiar to a person.

In a further advantageous refinement according to the first and second aspect, the secondary sensor unit is embodied as an electro-encephalograph. Electrical brain activity of the vehicle occupant can therefore be advantageously measured.

In a further advantageous refinement according to the first and second aspect, the secondary driver's request is represented by electrical brain activity of the vehicle occupant. This has the advantage that the vehicle occupant can direct his entire concentration to the current traffic situation and the secondary driver's request. The electrical brain activity which occurs during concentration on the secondary driver's request is interpreted as being a secondary driver's request.

In a further advantageous refinement according to the first and second aspect, a destination specification of the vehicle occupant is made available. In addition, data relating to a surrounding area of the vehicle is made available. In addition, the actuation signal is generated as a function of the destination specification of the vehicle occupant and of the data relating to the surrounding area of the vehicle and of the resulting driver's request of the vehicle occupant. A contribution is therefore advantageously made to ensuring safe motor vehicle operation as a function of the destination specification of the vehicle occupant and as a function of the data relating to e surrounding area of the vehicle and as a function of the resulting driver's request.

The destination specification of the vehicle occupant can be made available in advance here. The destination specification of the vehicle occupant can also be made available during ongoing operation, The destination specification may have been used in advance in order to determine route planning. The route planning includes here the best possible travel route from a current vehicle position to the destination specification of the vehicle occupant.

The data relating to the surrounding area of the vehicle include, for example, a current position of the vehicle and/or a potential obstacle in a directly surrounding area or in a course of the route planning.

If, owing to the resulting driver's request of the vehicle occupant, there is an increased probability that a collision will occur with the obstacle in the directly surrounding area, the actuation signal is generated in such a way that the probability of the collision is lowest as a result of the influencing of the driving behavior of the vehicle, wherein the actuation signal does not necessarily have to reflect the resulting driver's request.

The motor vehicle operation during which the generation of the actuation signal takes place as a function of the destination specification and as a function of the data relating to the surrounding area of the vehicle and, optionally, without additional influencing by the vehicle occupant, can also be referred to as an autonomous driving operation.

According to a third aspect, the invention is distinguished by a vehicle control system which includes a device according to the second aspect which is coupled by signaling technology to the at least one main sensor unit and the at least one secondary sensor unit and the at least one actuator.

According to a fourth aspect, the invention is distinguished by a computer program for operating a vehicle, wherein the computer program is designed to carry out the method for operating a vehicle or an advantageous refinement of the method, on a data processing device.

According to a fifth aspect, the invention is distinguished by a computer program product which includes executable program code, wherein when executed by a data processing device the program code executes the method for operating a vehicle or an advantageous refinement of the method.

The computer program product includes, in particular, a medium which can be read by the data processing device and on which the program code is stored.

Other objects, advantages and novel features of the present invention will become apparent from the following detailed description of one or more preferred embodiments lien considered in conjunction with the accompanying drawings.

DETAILED DESCRIPTION OF THE DRAWINGS

Figure 1:
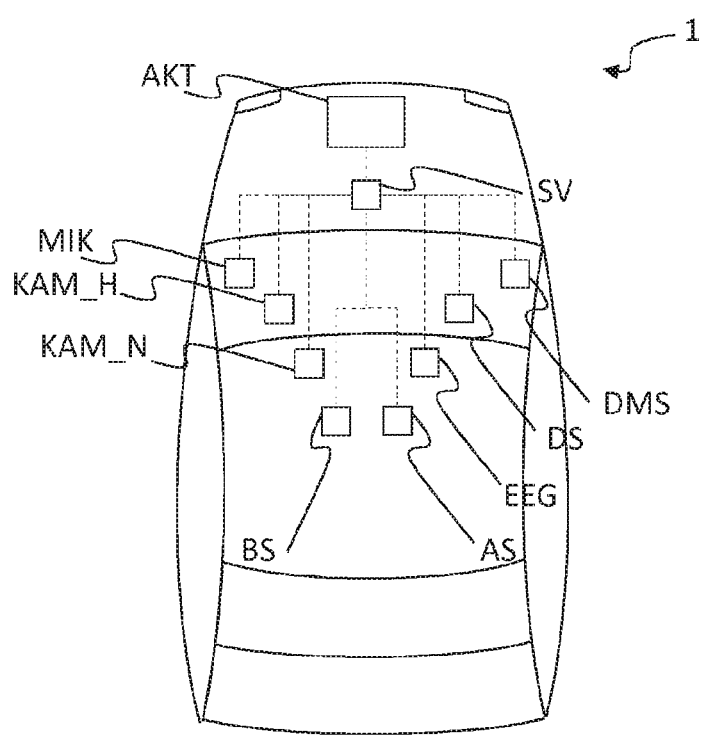
FIG. 1 is a schematic diagram of a vehicle with a vehicle control system.

FIG. 1 shows a vehicle 1. The vehicle 1 has a plurality of main sensor units such as, for example, a pressure sensor DS, a torque sensor DMS, a contact sensor unit BS, a proximity sensor unit AS, and an image-processing main sensor unit KAM_H. The vehicle 1 can include a subset of the specified main sensor units or else additional main sensor units. Furthermore, the vehicle 1 includes a plurality of secondary sensor units including an image-processing secondary sensor unit KAM_N, an audio signal-processing unit MIK and an electro-encephalograph EEG. The vehicle 1 can include a subset of the specified secondary sensor units or else additional secondary sensor units.

The main sensor units and the secondary sensor units are arranged in the passenger compartment of the vehicle. The main sensor units and the secondary sensor units are coupled, for example, via a bus system to a control device SV, which is illustrated schematically by dashed lines.

The vehicle 1 also has an actuator AKT. The actuator AKT can be, for example, a steering system, a brake and/or a drive train or parts of the drive train. Parts of the drive train can be, for example, a transmission, an internal combustion engine and/or a throttle valve position. The actuator AKT is electrically coupled, for example via a bus system, to the control device SV.

The control device SV has, for example, a data and program memory and a computing unit. The data and program memory and/or the computing unit can be embodied in one component and/or distributed between two components or among a plurality of components.

The control device SV is designed to receive, via the coupling to the main sensor units, a measurement signal MS_H of the main sensor unit, which measurement signal MS_H is characteristic of a main driver's request, The control device SV is also designed to receive, via the coupling to the secondary sensor units, a measurement signal MS_N of the secondary sensor unit, which measurement signal MS_N is characteristic of a secondary driver's request, The control device SV is also designed to transmit an actuation signal SS to the actuator which influences the driving behavior of the vehicle as a function of the actuation signal SS.

The control device SV can also be referred to as a device for operating a vehicle. The control device SV can also be referred to as a data processing device.

The pressure sensor DS can be arranged, for example, on a steering wheel. A main driver's request can be inferred as a function of a pressure applied to the pressure sensor DS by a hand or a foot of a vehicle occupant. For example, an intensity of the main driver's request can also be interred as a function of the applied pressure. In addition, the main driver's request can be inferred as a function of a relative position of the vehicle occupant with respect to the particular position of the pressure sensor DS. If the pressure sensor DS is arranged, for example, on a left-hand side relative to the vehicle occupant, a desired turning process of the vehicle 1 to the left can be inferred.

The torque sensor DMS can be arranged, for example, on an axle of the steering wheel, The main driver's request can be inferred as a function of torque applied to the torque sensor DMS by the hand or the foot of the vehicle occupant. It is also possible, for example, to infer the intensity of the main driver's request as a function of the intensity of the applied torque or an angular speed of the steering wheel.

The contact sensor unit BS can include, for example, a plurality of elements which are arranged as a layer. The contact sensor unit BS can contain sensor elements which operate resistively, capacitively, inductively and/or temperature-sensitively. The contact sensor unit BS can be, for example, part of a touchscreen. The contact sensor unit BS can be arranged, for example, on the center console of the vehicle 1. The main driver's request can be inferred as a function of contact with the contact sensor unit BS applied by the hand or the foot of the vehicle occupant. In addition, the main driver's request can be inferred as a function of a relative position of the vehicle occupant with respect to the particular position of the contact sensor unit BS. A contact gesture can be inferred as a function of the movement which is carried out when contact is applied to the contact sensor unit BS by the vehicle occupant. The contact gesture can be, for example, swiping from right to left on the contact sensor unit BS and can be interpreted as a desired turning process of the vehicle 1 to the left.

The proximity sensor unit AS can include, for example, a plurality of elements which are arranged as a layer. The proximity sensor unit can contain sensor elements which operate resistively, capacitively, inductively and/or temperature-sensitive The proximity sensor unit AS can be, for example, part of a touchscreen. The proximity sensor unit AS can be arranged, for example, on the center console of the vehicle 1. The main driver's request can be inferred as a function of an approach to the proximity sensor unit AS which is carried out by the hand or the foot of the vehicle occupant. In addition, the main driver's request can be inferred as a function of a relative position of the vehicle occupant with respect to the particular position of the proximity sensor unit AS.

The image-processing main sensor unit KAM_H is arranged, for example, in such a way that a region of a passenger compartment of the vehicle 1 is sensed. The region of the passenger compartment includes here predefined room for maneuvering of the vehicle occupant. The driver's main request can be inferred as a function of a movement within the predefined room for maneuvering which is carried out by the hand or the foot of the vehicle occupant and is sensed by the image-processing main sensor unit KAM_H. A gesture can be inferred as a function of the movement of the hand or the foot of the vehicle occupant. The gesture can be, for example, pointing with a finger to the left and can be interpreted as a desired turning process of the vehicle 1 to the left.

The image-processing secondary sensor unit KAM_N is arranged, for example, in such a way that the region of the passenger compartment of the vehicle 1 is sensed. A secondary driver's request can be inferred as a function of a movement which is carried out other than by the hand or the foot of the vehicle occupant and is sensed by the image-processing secondary sensor unit KAM_N, for example a movement of at least one eye of the vehicle occupant. The image-processing secondary sensor unit KAM_N can be designed to sense a viewing direction of the vehicle occupant. The secondary driver's request can be inferred as a function of the viewing direction of the vehicle occupant within a predefined region. For example, the image-processing secondary sensor unit KAM_N senses a view of the vehicle occupant through a front windshield of the vehicle 1. The predefined region includes, for example, an outer edge of the front windshield. If the viewing direction of the vehicle occupant is, for example, toward the left-hand outer edge of the front windshield, the secondary driver's request to turn to the left can be inferred.

The audio signal-processing unit MIK is arranged, for example, in an inner roof lining of the vehicle 1 in the direct vicinity of the vehicle occupant's head. The secondary driver's request can be inferred as a function of a voice command which is spoken by the vehicle occupant and is sensed by the audio signal-processing unit MIK. The voice command can include predefined commands. For example, the command "turn left" can be interpreted as being a secondary driver's request to turn left.

The secondary driver's request can be inferred as a function of electrical brain activity of the vehicle occupant which is generated, for example, when the vehicle occupant is concentrating his thoughts on the secondary driver's request, by means of the electro-encephalograph (EEG). If the vehicle occupant thinks, for example, the command "turn left", this can be interpreted as being a secondary driver's request to turn left.

Figure 2:
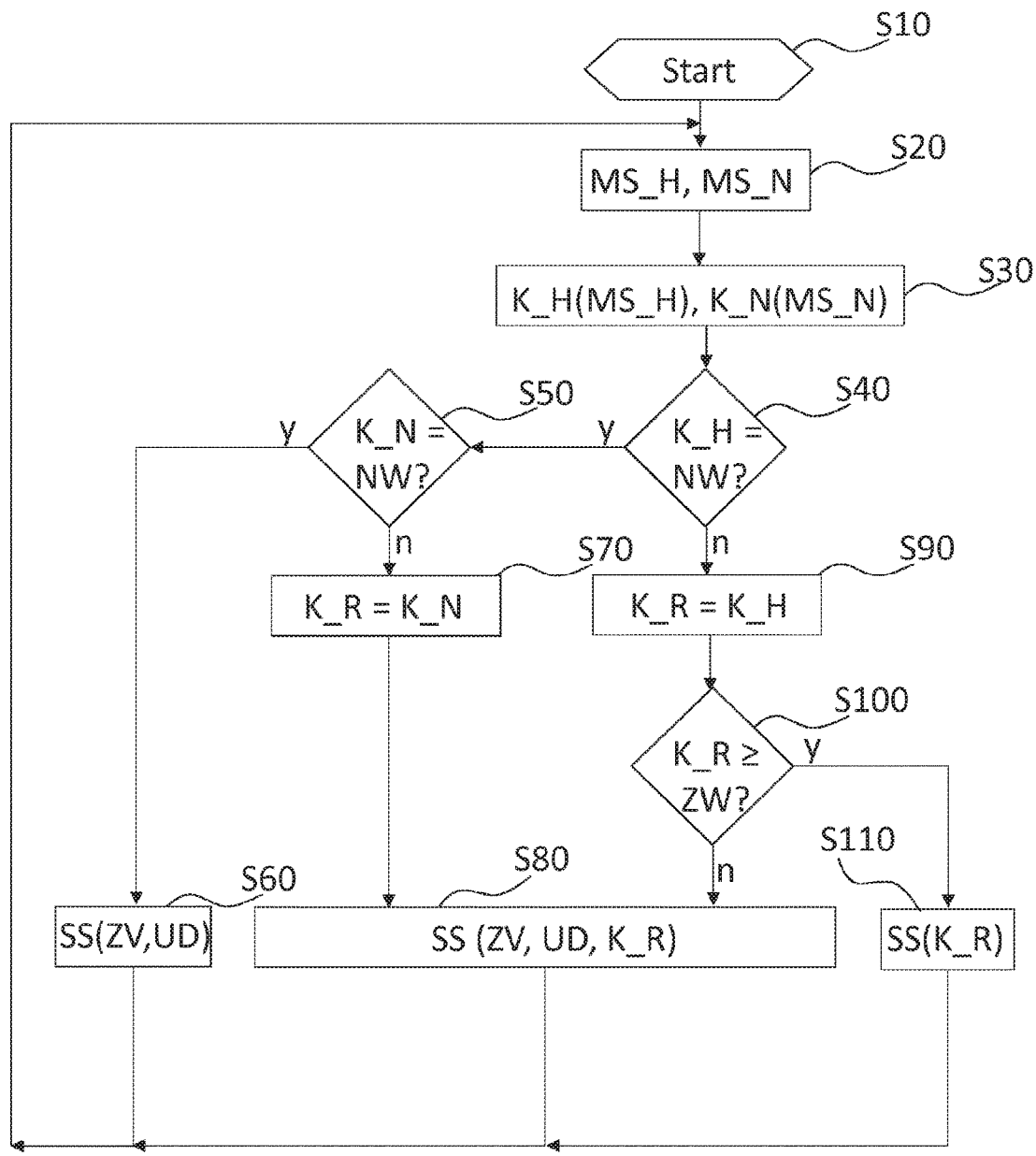
FIG. 2 is a flowchart for operating a vehicle.

In particular, a program which is explained in more detail below with reference to the flowchart in FIG. 2 is stored in the data and program memory of the control device SV.

The program is started in a step S10 in which, for example, variables are initialized.

In a step S20, the measurement signal MS_H of the at least one main sensor unit and the measurement signal MS_N of the at least one secondary sensor unit are made available. The measurement signal MS_H of the respective main sensor unit is characteristic of the respective main driver's request of the vehicle occupant. The measurement signal MS_N of the respective secondary sensor unit is characteristic of the respective secondary driver's request of the e vehicle occupant. The respective main driver's request and the respective secondary driver's request can include both simple to complex driving maneuvers. A simple driving maneuver includes, for example, acceleration of the vehicle. A complex driving maneuver includes, for example, a lane change of the vehicle, a turning process of the vehicle anchor an overtaking maneuver of the vehicle.

In a step S30, a main driver's request characteristic value K_H is determined as a function of the measurement signal MS_H of the main sensor unit, and a secondary driver's request characteristic value K_N is determined as a function of the measurement signal MS_N of the secondary sensor unit. The main driver's request characteristic value K_H is representative of the main driver's request. The secondary driver's request characteristic value K_N is representative of the secondary driver's request.

In a step S40, the main driver's request characteristic value K_H is compared for identity with a predefined neutral value NW. The neutral value NW is representative, in respect of the main driver's request, of the fact that the vehicle occupant has supposedly not expressed a main driver's request, that is to say, the main driver's request supposedly has a neutral value. If the main driver's request characteristic value K_H corresponds to the neutral value NW, the program is continued in a step S50. Otherwise the program is continued in a step S90.

In the step S50, the secondary driver's request characteristic value K_N is compared for identity with the predefined neutral value NW. The neutral value NW is, in respect of the secondary driver's request, representative of the fact that the vehicle occupant has supposedly not expressed a secondary driver's request, that is to say the secondary driver's request supposedly has the neutral value. If the secondary driver's request characteristic value K_N corresponds to the neutral value NW, the program is continued in a step S60. Otherwise, the program is continued in a step S70.

In the step S60, the actuation signal SS is generated as a function of a destination specification ZV of the vehicle occupant and as a function of data relating to the surrounding area UD of the vehicle 1. Neither the main driver's request characteristic value K_H nor the secondary driver's request characteristic value K_N has an influence on the generation of the actuation signal SS in the step S60.

The destination specification ZV of the vehicle occupant may already have been made available before the start of the program. In particular, the destination specification ZV may have been used in advance to carry out planning of a route. The route includes here a best possible path from a vehicle position determined at the time of planning and the destination specification ZV of the vehicle occupant. The desired route can also be adapted as a function of a current vehicle position. The route and the adaptation of the route is optionally signaled, for example visually or acoustically, for example by means of what is referred to as a head-up display.

The data relating to the surrounding area UD of the vehicle 1 includes, for example, the current vehicle position and/or an obstacle in a directly surrounding area of the vehicle 1 as well as basically an obstacle in the further course of the route.

The actuation signal SS is generated in the step S60 in such away that by influencing a driving behavior of the vehicle a contribution is made to making a probability of a collision with the obstacle in the directly surrounding area small. The actuation signal SS is also generated in such a way that by influencing the driving behavior of the vehicle a contribution is made to ensuring that laws are not infringed by the motor vehicle operation.

The motor vehicle operation during which the generation of the actuation signal SS takes place as a function of the destination specification ZV and as a function of the data relating to the surrounding area UD of the vehicle 1 and, optionally, without additional influencing by the vehicle occupant, can also be referred to as an autonomous driving operation. Therefore, an autonomous driving operation is occurring if the step S60 is run through.

After the step S60, the program is, if appropriate, continued in the step S20 after a predefined waiting time.

In the step S70, a resulting driver's request characteristic value K_R, is determined as a function of the secondary driver's request characteristic value K_N and independently of the main driver's request characteristic value K_H. In particular, the secondary driver's request characteristic value K_N is assigned directly, for example, to the resulting driver's request characteristic value K_R. The program is then continued in a step S80.

Alternatively or additionally, in the step S70 it is possible, in the case of a plurality of secondary sensor units, to prioritize the respective secondary driver's request characteristic value K_N within the scope of the determination of the resulting driver's request characteristic value K_R, if appropriate as a function of a respective reliability characteristic value which is representative of a reliability when the respective secondary driver's request characteristic value K_N is determined. Alternatively or additionally, a predefined weighting of the respective secondary driver's request characteristic value K_N can take place within the scope of the determination of the resulting driver's request characteristic value K_R, if appropriate as a function of the respective reliability characteristic value.

In the step S80, the actuation signal SS is generated as a function of the destination specification ZV of the vehicle occupant and as a function of the data relating to the surrounding area UD of the vehicle 1 and as a function of the resulting driver's request characteristic value K_R.

The actuation signal SS is generated in the step S80 in such a way that by influencing a driving behavior of the vehicle a contribution is made to making the probability of the collision with the obstacle in the directly surrounding area small. The actuation signal SS is also generated in such a way that by influencing the driving behavior of the vehicle a contribution is made to ensuring that laws are not infringed by the motor vehicle operation. Accordingly, by means of the actuator AKT, the driving behavior of the vehicle 1 is influenced as a function of the actuation signal SS only under the abovementioned conditions, in such a way that the resulting driver's request of the vehicle occupant is implemented. The autonomous driving operation is occurring if the step S80 is run through.

After the step S80, the program is continued in the step S20 after a specific delay.

In the step S90, the resulting driver's request characteristic value K_R is determined as a function of the main driver's request characteristic value K_H and independently of the secondary driver's request characteristic value K_N. In particular, the main driver's request characteristic value K_H is, for example, assigned directly to the resulting driver's request characteristic value. Therefore, in the case of multimodal or simultaneous driver inputs, the main driver's request can always be taken into account, that is to say prioritized, The program is subsequently continued in a step S100.

In the step S100, the resulting driver's request characteristic value K_R is checked for identity with a predefined compulsory intervention value ZW and/or for an upward transgression of the predefined compulsory intervention value ZW. The compulsory intervention value ZW is present if the vehicle occupant has expressed a main driver's request with a particular intensity. This can be represented, for example, by a steering movement of the steering wheel which is carried out with a predefined speed by the vehicle occupant. If the compulsory intervention value ZW is present, the program is continued in a step S110. Otherwise, the program is continued in the step S80.

In the step S110, the actuation signal SS is generated as a function of the resulting driver's request characteristic value K_R. The actuation signal SS is accordingly generated, in particular, directly in away which corresponds to the resulting driver's request and without taking into account the destination specification ZW or the data relating to the surrounding area UD of the vehicle 1. This permits the main driver's request to be carried out reliably, for example in the event of a malfunction during the processing of the data relating to the surrounding area UD or in situations in which intervention by the vehicle occupant is absolutely necessary. After the step S110, the program is continued in the step S20. Optionally, the further generation of the control signal SS can then take place in accordance with the step S110, if appropriate until a predefined condition is met.

LIST OF REFERENCE SYMBOLS

1 Vehicle
SV Control device
AKT Actuator
MIK Audio signal-processing unit
KAM_H image-processing main sensor unit
KAM_N image-processing secondary sensor unit
BS Contact sensor unit
AS Proximity sensor unit
EEG Electro-encephalograph
DS Pressure sensor
DMS Torque sensor
S10 . . . S110 Program steps
MS_H Measurement signal of the main sensor unit
MS_N Measurement signal of the secondary sensor unit
K_H Main driver's request characteristic value
K_N Secondary driver's request characteristic value
K_R Resulting driver's request characteristic value
ZW Compulsory intervention value
ZV Destination specification
UD Data relating to the surrounding area
SS Actuation signal
NW Neutral value The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a vehicle equipped with:
   at least one main sensor unit whose measurement signal is characteristic of a main driver's request of a vehicle occupant with respect to influencing of a driving behavior of the vehicle, represented by a movement of a hand or a foot of the vehicle occupant,
   at least one secondary sensor unit whose measurement signal is characteristic of a secondary driver's request of the vehicle occupant with respect to influencing of the driving behavior of the vehicle, represented other than by the movement of the hand or the foot of the vehicle occupant, and
   at least one actuator which influences the driving behavior of the vehicle as a function of an actuation signal,
   wherein the method comprises the acts of:
   as a function of the main driver's request represented by he measurement signal of the main sensor and as a function of the secondary driver's request represented by the measurement signal of the secondary sensor, determining a resulting driver's request with respect to the influencing of the driving behavior of the vehicle;
   in a case of a neutral value of the main driver's request, assigning the secondary driver's request to the resulting driver's request and, otherwise, assigning the main driver's request to the resulting driver's request; and
   generating the actuation signal as a function of the resulting driver's request.

2. The method according to claim 1, wherein the main sensor unit is embodied as a pressure sensor and/or a torque sensor.

3. The method according to claim 1, wherein the main sensor unit is embodied as a contact sensor unit and/or a proximity sensor unit.

4. The method according to claim 1, wherein the main sensor unit is embodied as an image-processing main sensor unit.

5. The method according to claim 1, wherein the secondary sensor unit is embodied as an image-processing secondary sensor unit.

6. The method according to claim 5, wherein the secondary driver's request is represented by a viewing direction of the vehicle occupant within a predefined region.

7. The method according to claim 1, wherein the secondary sensor unit is embodied as an audio signal-processing unit.

8. The method according to claim 7, wherein the secondary driver's request is represented by a voice command of the vehicle occupant.

9. The method according to claim 1, wherein the secondary sensor unit is embodied as an electro-encephalograph.

10. The method according to claim 9, wherein the secondary driver's request is represented by electrical brain activity of the vehicle occupant.

11. The method according to claim 1, wherein:
    a destination specification of the vehicle occupant is made available,
    data relating to a surrounding area of the vehicle is made available, the actuation signal is generated as a function of the destination specification of the vehicle occupant and of the data relating to the surrounding area of the vehicle and of the resulting driver's request of the vehicle occupant.

12. A vehicle control system, comprising:
at least one main sensor unit whose measurement signal is characteristic of a main driver's request of a vehicle occupant with respect to influencing of a driving behavior of the vehicle, represented by a movement of a hand or a foot of the vehicle occupant;
at least one secondary sensor unit whose measurement signal is characteristic of a secondary driver's request of the vehicle occupant with respect to influencing of the driving behavior of the vehicle, represented other than by the movement of the hand or the foot of the vehicle occupant;
at least one actuator which influences the driving behavior of the vehicle as a function of an actuation signal; and
a device for operating the vehicle, the device being coupled via signaling technology to the main sensor unit, the secondary sensor unit, and the actuator, wherein the device comprises a processor and associated memory storing program code which, when executed, causes the processor to:
as a function of the main driver's request represented by the measurement signal of the main sensor and as a function of the secondary driver's request represented by the measurement signal of the secondary sensor, determine a resulting driver's request with respect to the influencing of the driving behavior of the vehicle;
in a case of a neutral value of the main driver's request, assign the secondary driver's request to the resulting driver's request and, otherwise, assigning the main driver's request to the resulting driver's request; and
generate the actuation signal as a function of the resulting driver's request.

13. A computer program product comprising a non-transitory computer readable medium having stored thereon program code which, when executed in a vehicle equipped with:
at least one main sensor unit whose measurement signal is characteristic of a main driver's request of a vehicle occupant with respect to influencing of a driving behavior of the vehicle, represented by a movement of a hand or a foot of the vehicle occupant,
at least one secondary sensor unit whose measurement signal is characteristic of a secondary driver's request of the vehicle occupant with respect to influencing of the driving behavior of the vehicle, represented other than by the movement of the hand or the foot of the vehicle occupant, and
at least one actuator which influences the driving behavior of the vehicle as a function of an actuation signal,
carries out the acts of:
as a function of the main driver's request represented by the measurement signal of the main sensor and as a function of the secondary driver's request represented by the measurement signal of the secondary sensor, determining a resulting driver's request with respect to the influencing of the driving behavior of the vehicle;
in a case of a neutral value of the main driver's request, assigning the secondary driver's request to the resulting driver's request and, otherwise, assigning the main driver's request to the resulting driver's request; and
generating the actuation signal as a function of the resulting driver's request.

* * * * *